(12) United States Patent
Kish et al.

(10) Patent No.: US 11,628,936 B2
(45) Date of Patent: Apr. 18, 2023

(54) WIRELESS MOBILE MAINTENANCE DISPLAY UNIT AND SYSTEM FOR CARGO HANDLING SYSTEM

(71) Applicant: GOODRICH CORPORATION, Charlotte, NC (US)

(72) Inventors: Shad Kish, Jamestown, ND (US); Aaron J. Roberts, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 903 days.

(21) Appl. No.: 16/387,273

(22) Filed: Apr. 17, 2019

(65) Prior Publication Data
US 2020/0331610 A1    Oct. 22, 2020

(51) Int. Cl.
| | |
|---|---|
| *B64D 9/00* | (2006.01) |
| *B64C 19/00* | (2006.01) |
| *B64D 47/08* | (2006.01) |
| *B64F 5/00* | (2017.01) |
| *G05B 23/00* | (2006.01) |
| *G05B 23/02* | (2006.01) |
| *G06F 11/07* | (2006.01) |
| *G07C 5/08* | (2006.01) |

(52) U.S. Cl.
CPC .............. *B64D 9/003* (2013.01); *B64C 19/00* (2013.01); *B64D 47/08* (2013.01); *B64F 5/00* (2013.01); *G05B 23/00* (2013.01); *G05B 23/0267* (2013.01); *G06F 11/0736* (2013.01); *G07C 5/08* (2013.01); *B64D 2009/006* (2013.01)

(58) Field of Classification Search
CPC .. B64D 9/003; B64D 47/08; B64D 2009/006; B64C 19/00; B64F 5/00; G05B 23/00; G05B 23/0267; G06F 11/0736; G07C 5/08

USPC .............................................. 701/32.7
See application file for complete search history.

(56) References Cited

U.S. PATENT DOCUMENTS

| | | | |
|---|---|---|---|
| 4,943,919 A | * | 7/1990 | Aslin ................ G07C 5/006 |
| | | | 701/32.7 |
| 5,046,076 A | | 9/1991 | Hill |
| 6,871,823 B2 | | 3/2005 | Roberts |
| 6,965,816 B2 | | 11/2005 | Walker |

(Continued)

FOREIGN PATENT DOCUMENTS

| | | |
|---|---|---|
| CA | 2823078 | 2/2014 |
| DE | 102008052432 | 5/2009 |

(Continued)

OTHER PUBLICATIONS

USPTO, Non-Final Office Action dated Sep. 23, 2021 in U.S. Appl. No. 16/387,285.

(Continued)

*Primary Examiner* — Gertrude Arthur Jeanglaude
(74) *Attorney, Agent, or Firm* — Snell & Wilmer L.L.P.

(57) ABSTRACT

A cargo handling system is disclosed. In various embodiments, the system includes a wireless mobile maintenance display unit; a line replaceable unit; a data device configured to provide an operational status data concerning the line replaceable unit to the wireless mobile maintenance display unit; a first server configured to store a catalog of parts for repairing the line replaceable unit; and a system controller configured to communicate with a source of replacement parts for the line replaceable unit.

20 Claims, 11 Drawing Sheets

(56) References Cited

U.S. PATENT DOCUMENTS

| | | | |
|---|---|---|---|
| 6,991,082 B2 * | 1/2006 | Olson | B65G 39/12 |
| | | | 193/35 MD |
| 7,003,374 B2 | 2/2006 | Olin et al. | |
| 7,198,227 B2 | 4/2007 | Olin et al. | |
| 8,220,750 B2 | 7/2012 | Hettwer | |
| 8,308,107 B2 | 11/2012 | Hettwer | |
| 8,515,656 B2 | 8/2013 | Reed et al. | |
| 9,703,476 B1 | 7/2017 | Pappas | |
| 9,932,112 B1 | 4/2018 | Harms | |
| 9,973,263 B2 | 5/2018 | Hathaway | |
| 10,005,564 B1 | 6/2018 | Bhatia | |
| 2003/0093187 A1 | 5/2003 | Walker | |
| 2003/0225707 A1 | 12/2003 | Ehrman et al. | |
| 2005/0080520 A1 | 4/2005 | Kline | |
| 2005/0187677 A1 | 8/2005 | Walker | |
| 2005/0246057 A1 | 11/2005 | Olin et al. | |
| 2006/0038077 A1 | 2/2006 | Olin et al. | |
| 2007/0027589 A1 | 2/2007 | Brinkley | |
| 2007/0112488 A1 | 5/2007 | Avery et al. | |
| 2009/0016838 A1 | 1/2009 | Roberts | |
| 2009/0016839 A1 | 1/2009 | Roberts | |
| 2009/0121084 A1 * | 5/2009 | Hettwer | B64D 9/00 |
| | | | 244/137.1 |
| 2009/0121085 A1 | 5/2009 | Hettwer | |
| 2009/0192668 A1 * | 7/2009 | Payne | G07C 5/085 |
| | | | 701/33.4 |
| 2010/0100225 A1 * | 4/2010 | Reed | B64D 9/00 |
| | | | 701/124 |
| 2010/0213313 A1 | 8/2010 | Reed | |
| 2011/0273313 A1 | 11/2011 | Hettwer | |
| 2011/0312278 A1 | 12/2011 | Matsushita | |
| 2013/0006715 A1 | 1/2013 | Warkentin | |
| 2015/0225082 A1 | 8/2015 | Levron | |
| 2015/0251855 A1 | 9/2015 | Roberts | |
| 2015/0277492 A1 | 10/2015 | Chau | |
| 2015/0353198 A1 | 12/2015 | Stegmiller | |
| 2015/0363981 A1 | 12/2015 | Ziarno | |
| 2016/0117536 A1 | 4/2016 | Johnsen | |
| 2017/0046673 A1 | 2/2017 | Shibata | |
| 2017/0129606 A1 | 5/2017 | Roberts | |
| 2018/0029707 A1 | 2/2018 | Levron | |
| 2018/0102964 A1 | 4/2018 | Kao | |
| 2018/0194468 A1 | 7/2018 | Brown | |
| 2018/0234825 A1 | 8/2018 | Rochau | |
| 2019/0009881 A1 | 1/2019 | Harms | |
| 2019/0033888 A1 | 1/2019 | Bosworth | |
| 2019/0256227 A1 | 8/2019 | Balasubramanian et al. | |

FOREIGN PATENT DOCUMENTS

| | | |
|---|---|---|
| DE | 102008052468 | 5/2009 |
| DE | 102017130009 | 6/2018 |
| EP | 3725682 | 10/2020 |
| EP | 3725683 | 10/2020 |
| FR | 2917200 | 12/2008 |
| FR | 2935184 | 2/2010 |
| GB | 2536766 | 9/2016 |
| JP | 2013035539 | 2/2013 |
| WO | 02079918 | 10/2002 |
| WO | 03029922 | 4/2003 |
| WO | 2019043446 | 3/2019 |

OTHER PUBLICATIONS

European Patent Office, European Search Report dated Aug. 3, 2020 in Application No. 19216100.8.
European Patent Office, European Office Action dated May 17, 2021 in Applicatin No. 19216100.8.
European Patent Office, European Office Action dated May 18, 2021 in Applicatin No. 19215142.1.
European Patent Office, European Search Report dated Aug. 3, 2020 in Application No. 19215142.1.
USPTO, Final Office Action dated Mar. 4, 2022 in U.S. Appl. No. 16/387,285.
USPTO, Non-Final Office Action dated May 26, 2022 in U.S. Appl. No. 16/387,285.
USPTO, Final Office Action dated Sep. 16, 2022 in U.S. Appl. No. 16/387,285.
European Patent Office, European Search Report dated Jan. 19, 2023 in Application No. 23150333.5.
European Patent Office, European Search Report dated Feb. 17, 2023 in Application No. 23152865.4.
USPTO, Non-Final Office Action dated Jan. 5, 2023 in U.S. Appl. No. 16/387,285.

* cited by examiner

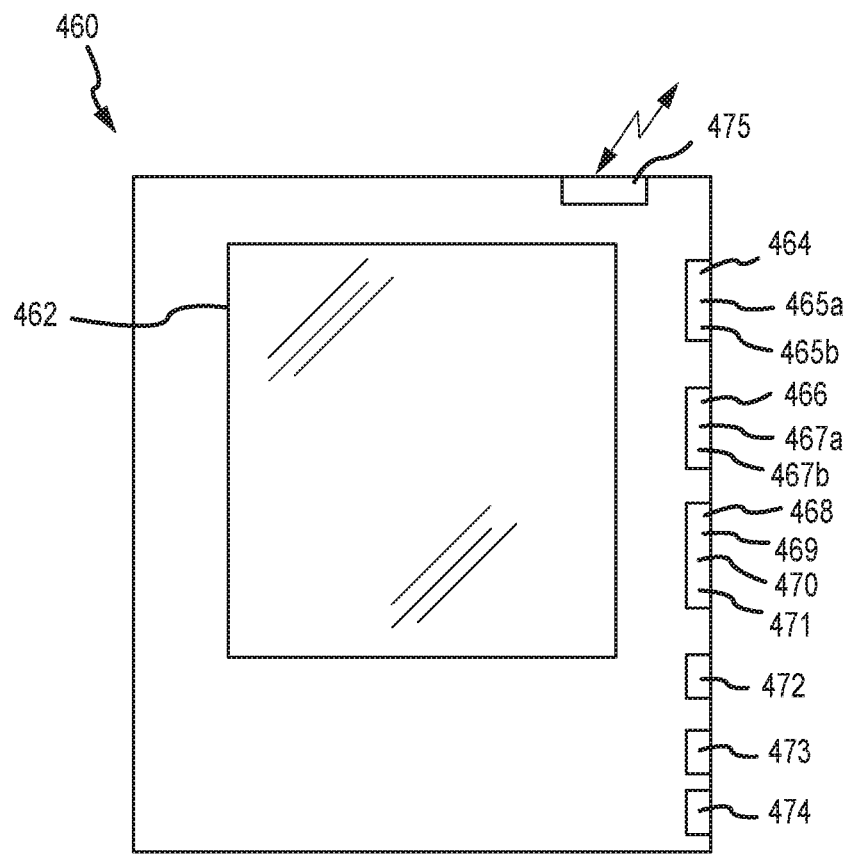
FIG.4A
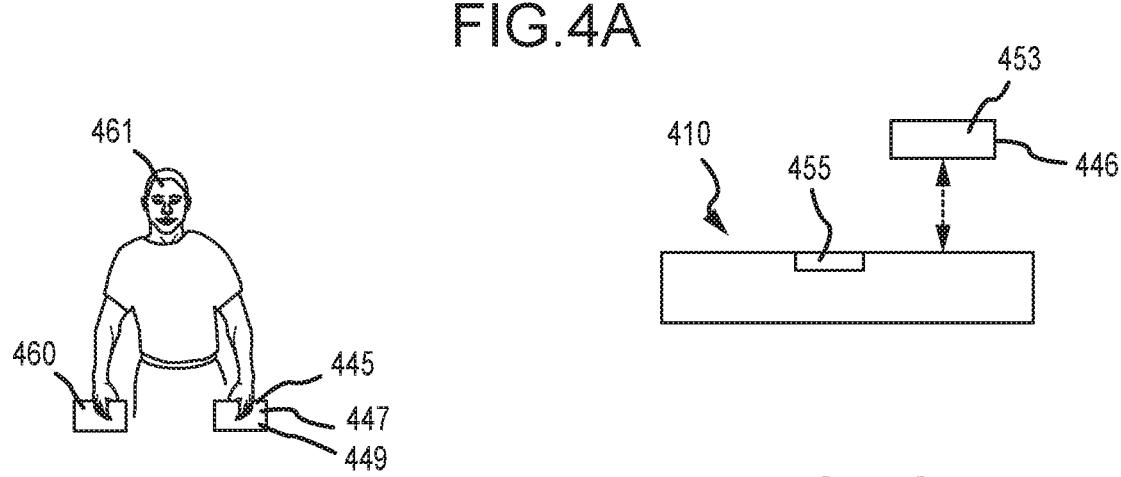
FIG.4B
FIG.4C

WIRELESS MOBILE MAINTENANCE DISPLAY UNIT AND SYSTEM FOR CARGO HANDLING SYSTEM

FIELD

The present disclosure relates generally to cargo handling systems and, more particularly, to systems used to monitor and maintain cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Motor driven rollers are typically employed in these systems. In certain aircraft, a plurality of motor driven power drive units (PDUs) is used to propel the containers or pallets within the cargo compartment. Once the containers or pallets reach a desired destination within a cargo compartment, restraint devices, such as, for example, latches may be deployed to restrain the containers or pallets from vertical or lateral movement during flight. This configuration facilitates transportation of the containers or pallets within the cargo compartment by one or more operators controlling operation of the PDUs. A wall-mounted cargo maintenance display unit (CMDU) may be configured to receive commands and display information relating to the operation or operational status of the various components comprising the cargo handling system, including, for example, the PDUs, a master control panel (MCP) and a plurality of local control panels (LCPs) distributed throughout the cargo handling system.

SUMMARY

A cargo handling system is disclosed. In various embodiments, the system includes a wireless mobile maintenance display unit; a line replaceable unit; a data device configured to provide an operational status data concerning the line replaceable unit to the wireless mobile maintenance display unit; a first server configured to store a catalog of parts for repairing the line replaceable unit; and a system controller configured to communicate with a source of replacement parts for the line replaceable unit.

In various embodiments, the data device comprises a radio frequency identification tag. In various embodiments, the radio frequency identification tag is configured to provide identification data of the line replaceable unit and the operational status data of the line replaceable unit. In various embodiments, the line replaceable unit comprises at least one of a power drive unit, a local control panel or a master control panel. In various embodiments, the wireless mobile maintenance display unit is configured to read identification data unique to an operator.

In various embodiments, a virtual training center is configured to provide access to simulator-like training materials, enabling an operator to receive assistance with inspection or repair of the line replaceable unit. In various embodiments, a second server is configured to store a fault isolation manual or a troubleshooting manual for the line replaceable unit. In various embodiments, the wireless mobile maintenance display unit is configured for operable communication with the second server.

In various embodiments, the wireless mobile maintenance display unit is configured for operable communication with at least one of the system controller or an auxiliary control system. In various embodiments, the at least one of the system controller or the auxiliary control system comprises a second server configured to store at least one of a fault isolation manual or a virtual training center.

A wireless mobile maintenance display unit is disclosed. In various embodiments, the unit includes a first reader configured to read an identification data unique to an operator; a second reader configured to read an operational status data of a line replaceable unit; a recording module configured to record an audio data or a video data concerning the line replaceable unit, the wireless mobile maintenance display unit being configured to communicate the audio data or the video data to a vendor or a support provider; a communication module configured for operable communication with a system controller or an auxiliary control system to communicate with the vendor or the support provider; and an operator alert configured to alert the operator of an anomaly within or associated with the line replaceable unit.

In various embodiments, the first reader includes at least one of a first radio frequency identification device or a near-field communication device configured to read the identification data unique to the operator. In various embodiments, the second reader includes a second radio frequency identification device configured to read the operational status data of the line replaceable unit. In various embodiments, the operator alert includes at least one of a rumble feedback mechanism, a visual indicator or a sound indicator. A camera is configured to capture a photograph of the line replaceable unit and the wireless mobile maintenance display unit is configured to forward the photograph to the vendor or the support provider.

A method of monitoring an operational status of a plurality of line replaceable units within a cargo handling system using a wireless mobile maintenance display unit is disclosed. In various embodiments, the method includes identifying a failed unit or an anomalous unit experiencing a failure or an anomaly from among the plurality of line replaceable units; reading, via the wireless mobile maintenance display unit, the operational status of the failed unit or the anomalous unit from a data device in operable communication with the failed unit or the anomalous unit; and activating an operator alert connected to the wireless mobile maintenance display unit configured to alert an operator of the failure or the anomaly within or associated with the failed unit or the anomalous unit.

In various embodiments, the method includes running a diagnostic analysis of the failed unit or the anomalous unit via the wireless mobile maintenance display unit. In various embodiments, the method includes accessing a server or a storage location configured to provide at least one of a fault isolation manual, a cargo load plan, a parts catalog or a virtual training center via the wireless mobile maintenance display unit. In various embodiments, the method further includes communicating with a source of replacement parts via the wireless mobile maintenance display unit to order replacement parts for the failed unit or the anomalous unit. In various embodiments, the plurality of line replaceable units comprises at least one of a power drive unit, a local control panel or a master control panel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 4A, 4B and 4C illustrate a wireless mobile maintenance display unit (WMMDU) in operable communication with an operator identification device associated with a particular operator and an operational status data device associated with a particular LRU, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
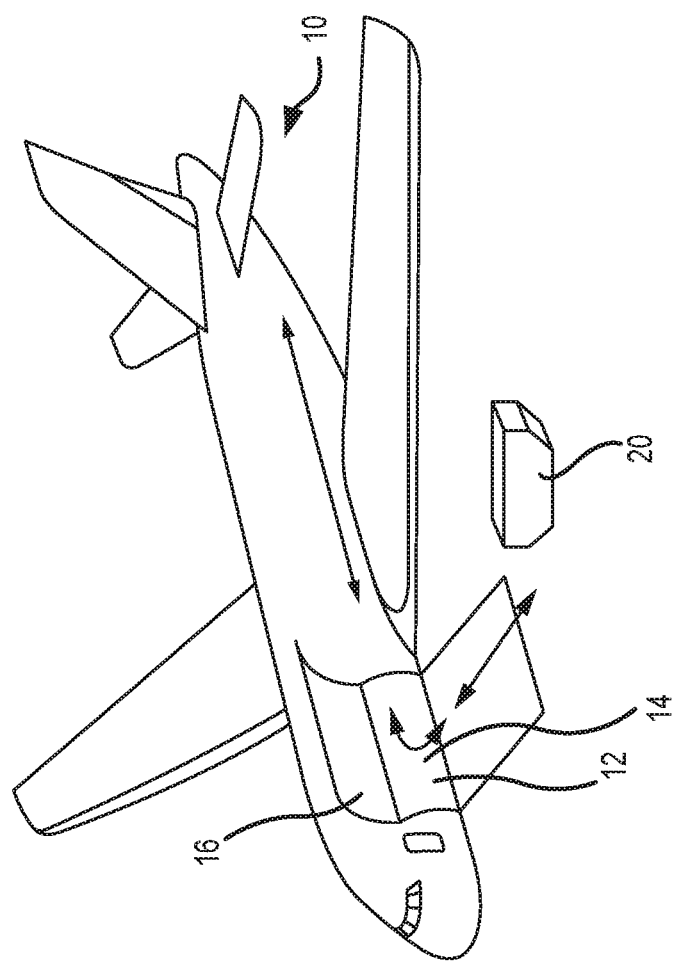
FIG. 1A illustrates a schematic view of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, the ULDs are available in various sizes and capacities and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought onboard the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
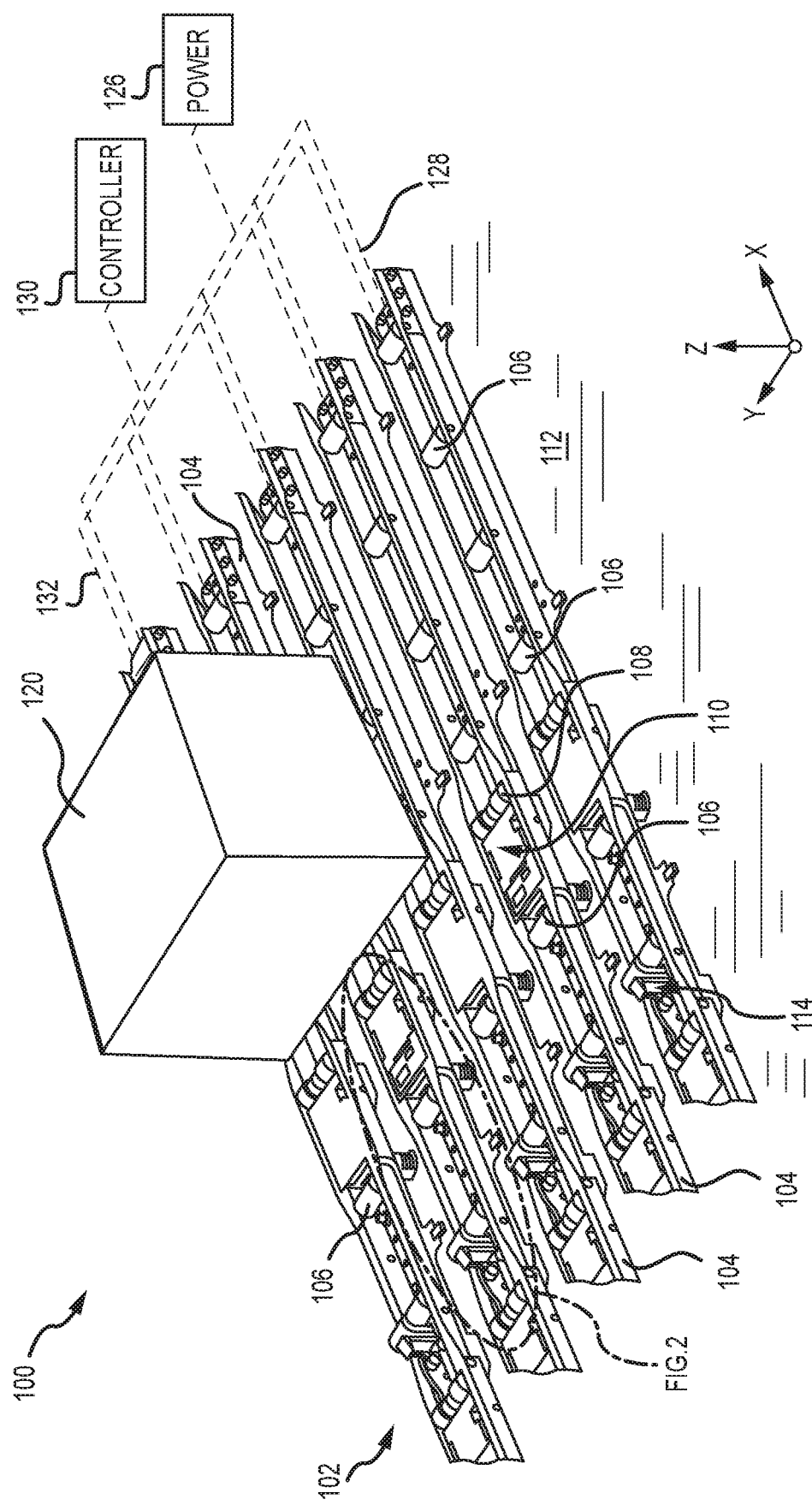
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. The ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110 (or a power drive unit), each of which may include one or more drive rollers 108 (or a drive roller) that may be actively powered by a motor. In various embodiments, one or more of the plurality of trays 104 is positioned longitudinally along the cargo deck 112—e.g., along the X-direction extending from a forward end to an aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each of the plurality of PDUs 110. In various embodiments, the one or more drive rollers 108 may be raised from a lowered position beneath the conveyance surface 102 to an elevated position above the conveyance surface 102 by the corresponding PDU.

As used with respect to the cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of powered rollers that may be selectively energized to propel or drive the ULD 120 in a desired direction over the cargo deck 112 of the aircraft. In addition, in various embodiments, the disclosure contemplates the use of steerable PDUs, such as, for example, a freighter common turntables (FCT), which enable translation of the ULD 120 in directions other than fore and aft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 arrives at a final or intended destination on the conveyance surface 102 for flight, corresponding ones of the plurality of restraint devices 114 are returned to upright positions, either by a motor driven actuator or a bias member, and locked against the ULD 120, thereby restraining or preventing the ULD 120 from translating in vertical or lateral directions.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112 or the conveyance surface 102. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128.

Figure 2:
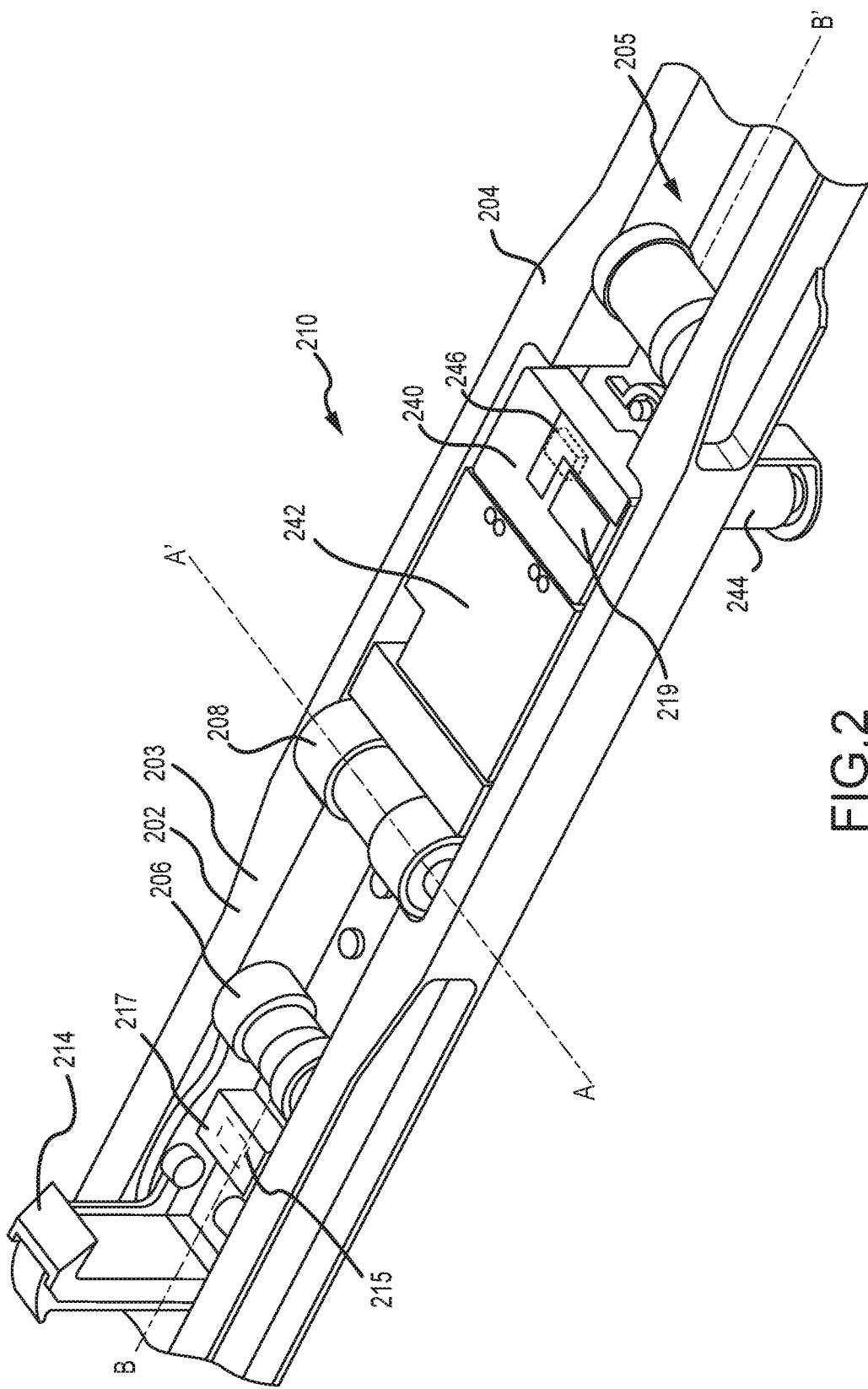
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programming. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device (RFID) tag or RFID tag 246, or similar device, configured to store, transmit or receive information or data—e.g., data related to an operational status of the PDU 210 or data identifying the unit and the location of the unit within a cargo handling system. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3A:
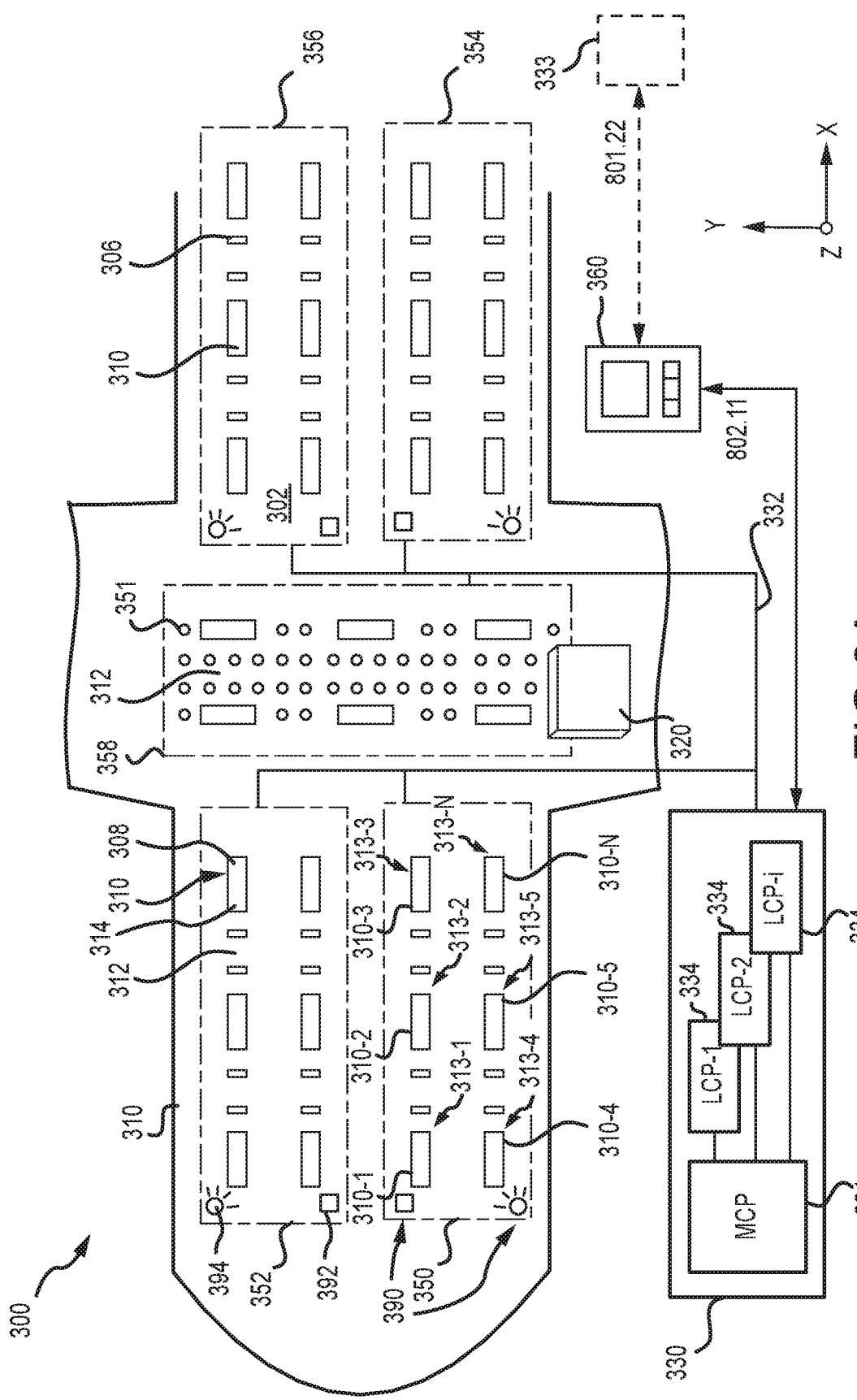
FIGS. 3A and 3B illustrate a schematic view of a cargo deck having a cargo handling system with a plurality of PDUs, in accordance with various embodiments.

Referring now to FIG. 3A, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, and the one or more drive rollers 308 and the restraint device 314 associated with each PDU 310, share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 while being guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 351 that serve as stabilizing and guiding apparatus for the ULD 320 while being conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four or more sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 313-N. In various embodiments, the location of each of the aforementioned individual PDUs on the conveyance surface 302 may have a unique location (or address) identifier, which, in various embodiments, may be stored in an RFID tag, such as, for example, the RFID tag 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be located in and configured to communicate with the PDUs residing in the forward port-side section 350, a second local control panel LCP-2 may be located in and configured to communicate with the PDUs residing in the forward starboard-side section 352, and one or more additional local control panels LCP-i may be located in and configured to communicate with the PDUs residing in one or more of the aft port-side section 354, the aft starboard-side section 356 and the lateral section 358. Thus, the master control panel 331 and the local control panels 334 may be configured to allow an operator to selectively engage or activate one or more of the plurality of PDUs 310 to propel the ULD 320 along the conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal. In various embodiments, the cargo handling system 300 may include a sensing system 390 that may comprise a plurality of sensors 392 and a plurality of cameras 394 configured to monitor activity, such as, for example, the presence of ULDs or operators within the various sections, throughout the cargo handling system 300.

Figure 3B:
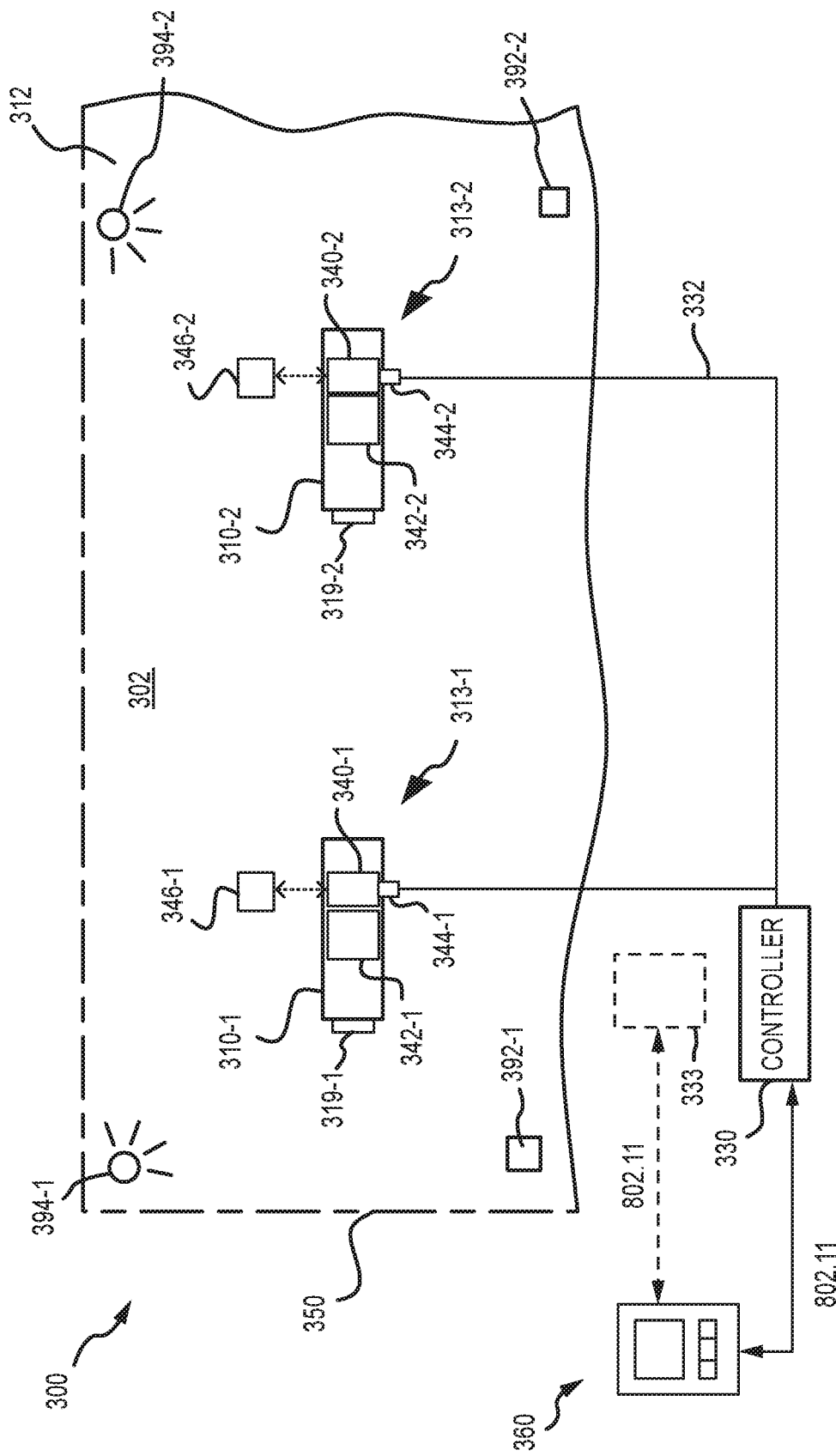

With reference to FIG. 3B, a schematic view of a portion of the cargo handling system 300 and the cargo deck 312 is shown in accordance with various embodiments. By way of non-limiting example, the system controller 330 is configured to send a command signal through the channel 332 to at least the first PDU 310-1 and the second PDU 310-2 of the forward port-side section 350. The command signal may, for example, comprise an instruction to activate or deactivate a first motor 342-1 associated with the first PDU 310-1 or a second motor 342-2 associated with the second PDU 310-2. The command signal may also comprise a first address that corresponds to the first location 313-1 or a second address that corresponds to the second location 313-2. A first unit controller 340-1 of the first PDU 310-1 may receive the command signal through a first connector 344-1 and a second unit controller 340-2 of the second PDU 310-2 may receive the command signal through a second connector 344-2. Following receipt of the signal, the first unit controller 340-1 and the second unit controller 340-2 may determine whether the command is intended to affect operation of the first PDU 310-1 or the second PDU 310-2, respectively, by comparing a location address contained within the signal to a known address associated with the respective PDUs. In various embodiments, the first address associated with the first PDU 310-1 may be stored in a first RFID tag 346-1 and the second address associated with the second PDU 310-2 may be stored in a second RFID tag 346-2. Additionally, a ULD sensor, such as, for example, the ULD sensor 219 described above with reference to FIG. 2 may be disposed proximate each PDU and configured to detect the presence of a ULD as the ULD is positioned over or proximate to the PDU. Accordingly, a first ULD sensor 319-1 may be disposed proximate or within the first PDU 310-1 and a second ULD sensor 319-2 may be disposed proximate or within the second PDU 310-2. In various embodiments, a first sensor 392-1 and a first camera 394-1 may be disposed proximate or within the first PDU 310-1 and a second sensor 392-2 and a second camera 394-2 may be disposed proximate or within the second PDU 310-2 for monitoring activity within the forward port-side section 350.

Still referring to FIGS. 3A and 3B, the cargo handling system 300 may include a mobile maintenance functionality configured to selectively display information relating to the operation or operational status of a line replaceable unit (LRU) comprising the cargo handling system 300—e.g., a power drive unit, a local control panel or a master control panel. In various embodiments, for example, the cargo handling system 300 may include a wireless mobile maintenance display unit (WMMDU) 360 wirelessly connected to the system controller 330 or to an auxiliary control system 333 dedicated to the mobile maintenance functionality. In various embodiments, the WMMDU 360 may be configured to monitor the operation or operational status of one or more of the plurality of PDUs 310, which may, for example, include the fixed PDUs described above (e.g., the PDU 210 described above with reference to FIG. 2) or the FCTs referred to above. In various embodiments, the WMMDU 360 may also be configured to control or to monitor the operation or operational status of the one or more local control panels 334 distributed throughout various sections of the cargo handling system 300, such as, for example, the forward port-side section 350, the forward starboard-side section 352, the aft port-side section 354 and the aft starboard-side section 356. In various embodiments, an aircraft having a cargo handling system, such as, for example, the cargo handling system 300 described above, may comprise hundreds of actuators used to actuate the various components associated with each of the plurality of PDUs 310 (e.g., the drive roller 208 and the restraint device 214 described above with reference to FIG. 2). Likewise, the cargo handling system 300 may comprise several LCPs distributed throughout each of the various sections (e.g., the forward port-side section 350). As described below, the WMMDU 360 provides a tool for an operator or member of a maintenance crew, with the benefit of local access and direct visibility, to inspect the operability or operational status of each LRU comprising the cargo handling system 300, such as, for example, one or more of the plurality of PDUs 310, the one or more local control panels 334 or the master control panel 331. In various embodiments, the WMMDU 360 may comprise any device capable of providing a human-machine interface between the operator or maintenance crew member and the cargo handling system 300 or the various components of the cargo handling system 300. In various embodiments, for example, the WMMDU 360 may comprise a smart-phone or a tablet or a device having similar features of a smart-phone or a tablet.

Referring now to FIG. 4A, a wireless mobile maintenance display unit (WMMDU) 460, similar to the wireless mobile maintenance display unit (WMMDU) 360 described above with reference to FIGS. 3A and 3B, is illustrated. In conjunction with FIG. 4A, an operator 461 manipulating the WMMDU 460 is illustrated in FIG. 4B, while an RFID tag 446, associated with a particular line replaceable unit (LRU), such as, for example, a PDU 410, is illustrated in FIG. 4C. As described elsewhere herein, the particular line replaceable unit may also include the master control panel 331 or one of the local control panels 334 described above with reference to FIG. 3A. The RFID tag 446 may be similar to one of the first RFID tag 346-1 associated with the first PDU 310-1 and the second RFID tag 346-2 associated with the second PDU 310-2 described above with reference to FIGS. 3A and 3B or the RFID tag 246 associated with the PDU 210 described above with reference to FIG. 2. An RFID tag, or similar information containing device, may also be associated with each local control panel configured to control operation of the PDU 410.

In various embodiments, the WMMDU 460 includes a touch sensitive display screen 462 (e.g., a graphical user interface). The touch sensitive display screen 462 may, in various embodiments, be sensitive to a stylus pen, an operator's fingers or some other manner configured to operate or manipulate applications accessible by the WMMDU 460. The WMMDU 460 may further include a first reader 464 configured to read and recognize data identifying the operator 461 of the WMMDU 460 and a second reader 466 configured to read and recognize data associated with the particular LRU undergoing inspection. The WMMDU 460 is described as including the first reader 464 and the second reader 466 for convenience, though, in various embodiments, the first reader 464 and the second reader 466 may be combined into a single reader or input module.

In various embodiments, the first reader 464 may comprise a first RFID reader 465a (or a first radio frequency identification device) configured to read and recognize data contained within a first data device 445 (see FIG. 4B), such as, for example, a first RFID tag 447 attached to a badge 449 or, similarly, a card or some other device holding identification data unique to the operator 461 of the WMMDU 460. In various embodiments, the first reader 464 may comprise, or be supplemented with, a near-field communication device 465b configured to read and recognize the identification data unique to the operator 461. In operation, the operator 461 positions the WMMDU 460 within a required proximity of the first data device 445, such that the first reader 464 may read the identification data unique to the operator 461. In various embodiments, the operator 461 may then logon to the WMMDU 460 or to a system controller or an auxiliary control system, such as, for example, the system controller 330 or the auxiliary control system 333, described above with reference to FIGS. 3A and 3B. This enables the operator 461 to establish a human-machine interface, via the WMMDU 460, with the cargo handling system, including each of the LRUs that comprise the system.

The second reader 466 may, in various embodiments, comprise a second RFID reader 467a (or a second radio frequency identification device) configured to read and recognize data contained within a second data device 453 (see FIG. 4C), such as, for example, the RFID tag 446 (or first radio frequency identification tag), associated with the PDU 410 (or first line replaceable unit) or with a second line replaceable unit, such as, for example, one or more of the local control panels 334 or the master control panel 331 described above with reference to FIGS. 3A and 3B. The second reader 466 may also include, or be supplemented with, a quick response (QR) reader 467b configured to read information contained within, for example, a QR code 455 that is unique to either the first line replaceable unit or the second line replaceable unit. In various embodiments, a bar code reader (either linear or matrix, for example) may also be included and configured to read information contained within a bar code. In operation, the operator 461 positions the WMMDU 460 within a required proximity of the second data device 453, such that the second reader 466 may read data concerning the operation or operational status of the first line replaceable unit (e.g., a first operational status data concerning the first line replaceable unit) or the second line replaceable unit (e.g., a second operational status data concerning the second line replaceable unit).

The WMMDU 460 may also include an operator alert 468 configured to alert the operator of the WMMDU 460 of an anomaly or a failure within or associated with a particular LRU (e.g., an anomalous unit or a failed unit), such as, for example, the PDU 410 or one or more of the local control panels 334 or the master control panel 331 described above with reference to FIGS. 3A and 3B. In various embodiments, for example, the operator alert 468 may comprise a rumble feedback mechanism 469, a visual indicator 470, such as a flashing light, or a sound indicator 471, such as an audible alarm. The operator alert 468 may be configured to respond to data or information received, for example, from the RFID tag 446 associated with the PDU 410 or from another LRU, such as, for example, one or more of the plurality of PDUs 310, one or more of the local control panels 334 or the master control panel 331 described above with reference to FIGS. 3A and 3B.

The WMMDU 460 may also include a camera 472. In various embodiments, the camera 472 may be used to photograph the LRU experiencing the anomaly, after which the WMMDU 460 may be used to forward the photograph to, for example, a vendor or support provider that provides customer support or product support. In various embodiments, the photograph may also be saved on a database, such as, for example, a file server in communication with an auxiliary control system, such as, for example, the auxiliary control system 333, described above with reference to FIGS. 3A and 3B. The WMMDU 460 may also include a storage module 473 configured to store content, such as, for example, notes taken during examination of the LRU experiencing the anomaly or otherwise being inspected. In various embodiments, the WMMDU may also include a recording module 474 for recording audio data or video data, such as, for example, voice memos, videos or written memoranda prepared by an operator. The recording module 474 may be used, in addition, to integrate repair orders, customer support assistance memoranda or to prepare and store related paperwork concerning maintenance. In various embodiments, the WMMDU also comprises a communication module 475 configured to communicate with one or more of a system controller or an auxiliary control system, such as, for example, the system controller 330 or the auxiliary control system 333 described above with reference to FIGS. 3A and 3B.

Figure 5:
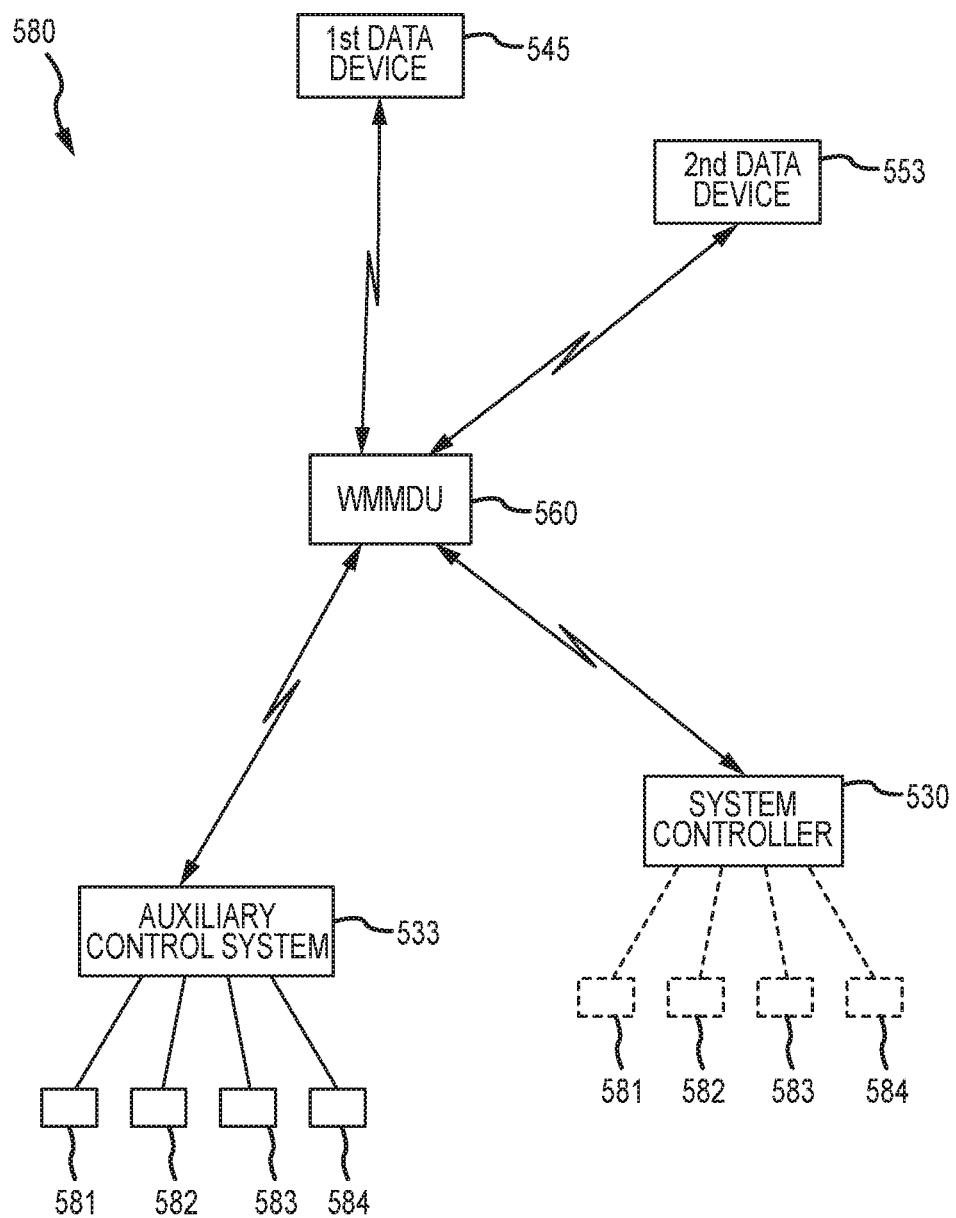
FIG. 5 illustrates a cargo maintenance system, in accordance with various embodiments.

Referring now to FIG. 5, a cargo maintenance system 580 is illustrated, in accordance with various embodiments. The cargo maintenance system 580 includes a wireless mobile maintenance display unit (WMMDU) 560, similar to the WMMDU 460 described above with reference to FIGS. 4A-4C. In various embodiments, the WMMDU 560 is configured to read and recognize identification data contained within a first data device 545, the identification data being unique to an operator of the WMMDU 560, such as, for example, the operator 461 described above with reference to FIG. 4B. Similarly, in various embodiments, the WMMDU 560 is configured to read and recognize identification and operational status data contained within a second data device 553, the identification and operational status data being associated with a particular LRU under inspection, such as, for example, the PDU 410 described above with reference to FIG. 4C or a one of the one or more local control panels 334 or the master control panel 331 described above with reference to FIGS. 3A and 3B.

Still referring to FIG. 5, in various embodiments, the cargo maintenance system 580 may further include a system controller 530 or an auxiliary control system 533, such as, for example, the system controller 330 or the auxiliary control system 333, described above with reference to FIGS. 3A and 3B. In various embodiments, one or more of the system controller 530 and the auxiliary control system 533 may be in operable communication with a training material file system 581 (e.g., a server or storage location containing training materials). The training material file system 581 may include or provide access to various training or inspection materials, such as, for example, a fault isolation manual or video or a troubleshooting manual or video that are specific to a particular LRU undergoing inspection. In various embodiments, one or more of the system controller 530 and the auxiliary control system 533 may be in operable communication with a plane take-off checklist system 582 (e.g., a server or storage location containing a plane take-off checklist). The plane take-off checklist system 582 may include or provide access to flight specific materials, such as, for example, a cargo load plan indicating the locations and weights for the various ULDs stored or to be stored throughout the cargo system.

Continuing with reference to FIG. 5, in various embodiments, one or more of the system controller 530 and the auxiliary control system 533 may also be in operable communication with a parts catalog 583 (e.g., a first server or storage location containing a catalog of parts or a parts catalog). The parts catalog 583 may be stored locally (e.g., on the system controller 530 or the auxiliary control system 533) or may be provided through access to a third-party website or a vendor or support provider of replacement parts via an Internet link. The parts catalog 583 may provide access to replacement parts that are specific to a particular LRU undergoing inspection. In various embodiments, one or more of the system controller 530 and the auxiliary control system 533 may also be in operable communication with a virtual training center 584 (e.g., a second server or storage location containing operator training materials). The virtual training center 584 may provide access to virtual reality or augmented reality tools, as well as simulator-type training materials, enabling an operator to receive assistance with inspection or repair of a particular LRU undergoing inspection.

In various embodiments, the cargo maintenance system 580 provides several advantages over current maintenance systems, such as, for example, maintenance systems having wall-mounted cargo maintenance display units. One such advantage is the ability to perform local inspection of a particular LRU that may be positioned a distance of one-hundred or more feet from the wall-mounted cargo maintenance display unit. Local inspection of the particular LRU may avoid the need for several operators to inspect the particular LRU—e.g., one operator positioned at the wall-mounted unit to operate the particular LRU and another operator positioned at the LRU to observe the operation. The cargo maintenance system 580 enables a single operator, via the WMMDU 560, to both operate the particular LRU and to observe the operation. This feature additionally provides an added advantage of increased safety over the multiple-operator scenario when a first operator is unable to maintain visual contact with a second operator or the particular LRU undergoing inspection. The advantages include immediate identification of the particular LRU undergoing inspection and direct communication with a vendor or support provider or other supplier of parts (collectively referred to as a source of replacement parts) for the particular LRU, leading to increased efficiency and reduced maintenance time. Other advantages include immediate access to manuals, videos or training materials that are provided at the exact location of the particular LRU undergoing inspection, which also leads to increased efficiency and reduced maintenance time.

Referring now to FIGS. 6A, 6B, 6C, 6D, 6E and 6F, flowcharts are provided illustrating extended functionalities of a cargo maintenance system, such as, for example, the cargo maintenance system 580 described above with reference to FIG. 5, having a wireless mobile maintenance display unit (WMMDU), such as, for example, the WMMDU 460 described above with reference to FIGS. 4A-4C and the WMMDU 560 described above with reference to FIG. 5. The cargo maintenance system is configured to monitor the operation or operational status of a cargo handling system, such as, for example, the cargo handling system 100 described above with reference to FIGS. 1A and 1B, and, more particularly, the line replaceable units comprising the cargo handling system.

Figure 6A:
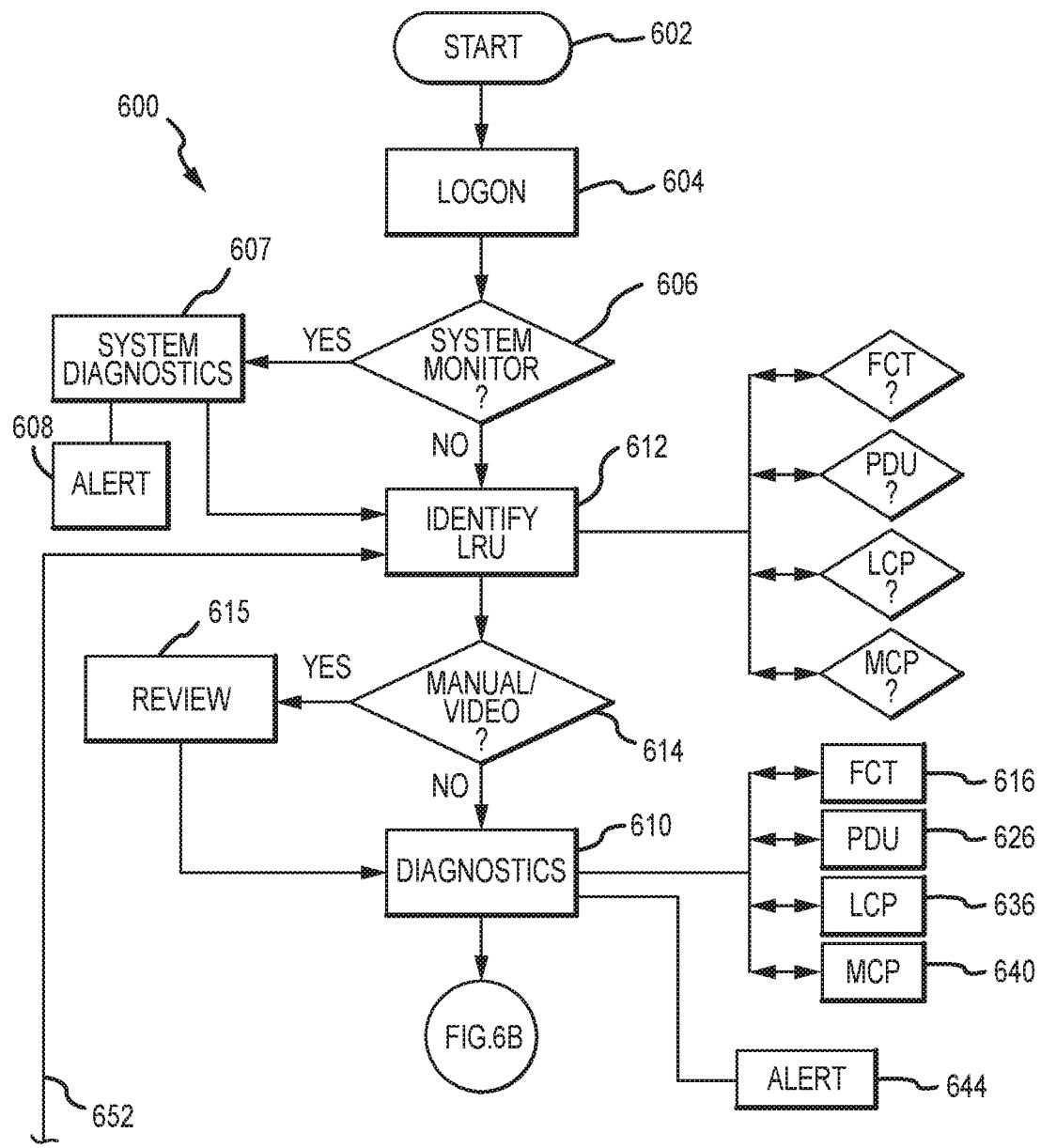
FIGS. 6A, 6B, 6C, 6D, 6E and 6F describe various steps in operating a WMMDU, in accordance with various embodiments.
Figure 6B:
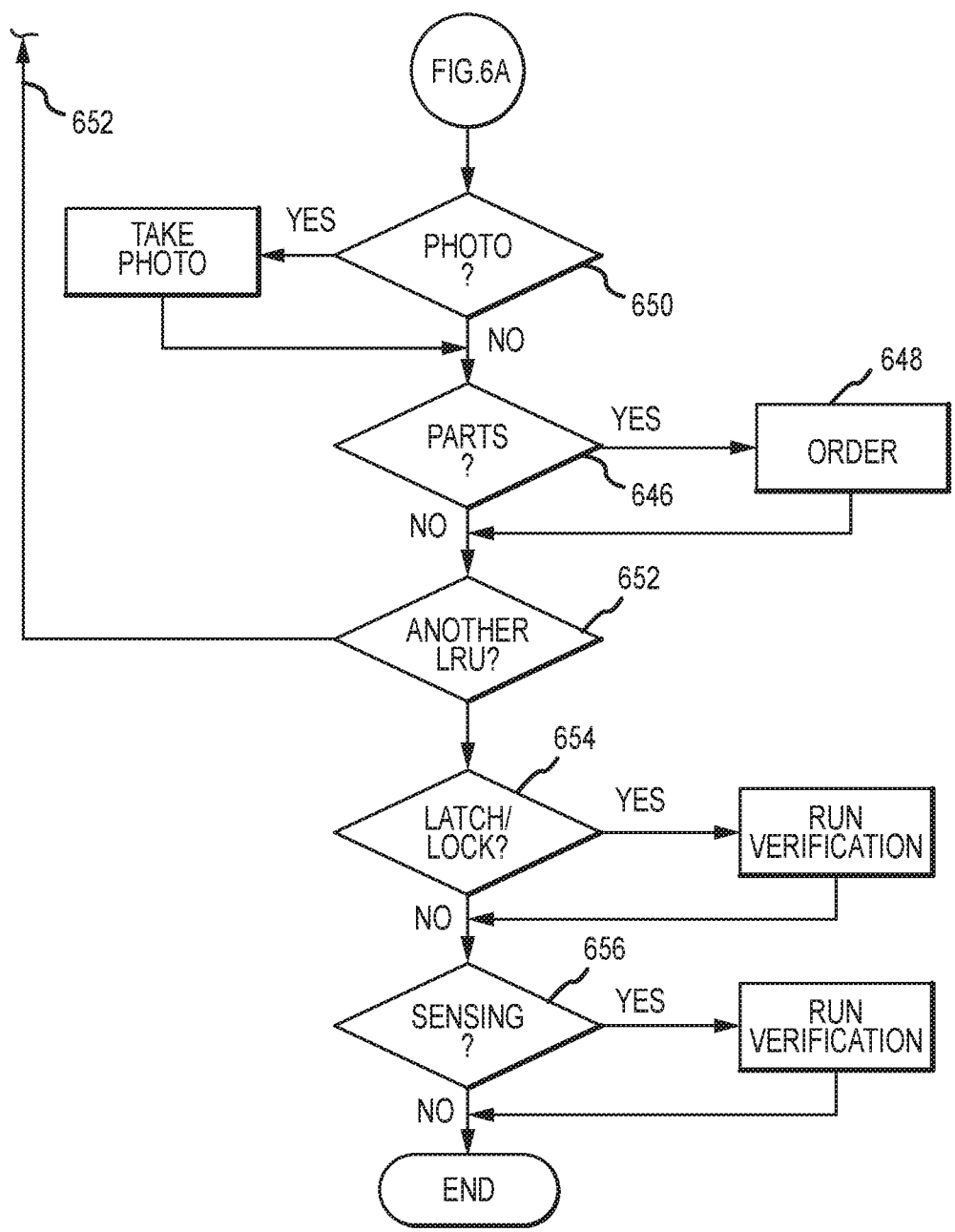

Referring to FIGS. 6A and 6B, a main flowchart 600 is illustrated, in accordance with various embodiments. After starting the WMMDU at step 602, the system allows an operator to logon to the system through the WMMDU at a logon step 604. In various embodiments, the operator may logon to the system by using the WMMDU to read an RFID tag disposed within a badge. In various embodiments, the operator may also log on to the system via facial recognition functionalities incorporated into the WMMDU. Such facial recognition functionalities may be configured to recognize, for example, an eye of the operator. In various embodiments, a fingerprint of the operator may similarly be recognized by the WMMDU. Once the recognition of the operator is confirmed by the WMMDU, a password may be entered on a touchscreen of the WMMDU to complete the logon step 604. In various embodiments, the logon step 604 may be configured to allow only one operator to logon to the system at a time, thereby preventing a second operator from accessing the system through a second WMMDU. Similarly, the WMMDU may be configured to allow the logon step 604 to be completed only when an operator attempting to logon to the system is physically present within the cargo hold of an aircraft or other area where the cargo handling system is located.

Once the operator completes the logon step 604, the WMMDU may access the operational status of all the line replaceable units comprising the system at a system monitoring step 606, which may include running system-wide diagnostics at a system diagnostics step 607. For example, the WMMDU may access the operational status of each of the PDUs or control panels comprising the cargo handling system, such as, for example, the plurality of PDUs 310 and the one or more local control panels 334 or the master control panel 331 distributed throughout the various sections of the cargo handling system 300 described above with reference to FIGS. 3A and 3B. If a failure of one of the line replaceable units is detected, or if a larger-scale failure, such as, for example, inoperability of the forward port-side section 350 in its entirety is detected, then the WMMDU may provide an operator alert at an operator alert step 608. In various embodiments, the operator alert may comprise one or more of a tactile (e.g., rumble) feedback, a visual indicator or a sound indicator, as described above with reference to FIG. 4A. A failure of one of the line replaceable units or a larger-scale failure may be identified on the graphical user interface of the WMMDU. In the event of a larger-scale failure, appropriate investigation and remedial steps may be taken in order to resolve the larger-scale failure. In the event of a failure of a line replaceable unit(s), or an anomaly associated therewith, the operator may proceed to run diagnostics on the line replaceable unit(s) identified at a diagnostic step 610, as described further below, either starting with the diagnostic step 610 or at an identification step 612. In various embodiments, the diagnostic step 610 may be carried out using the WMMDU at the location of a line replaceable unit (e.g., by positioning the WMMDU proximate the line replaceable unit and reading the various information directly from the line replaceable unit), or remote from the line replaceable unit (e.g., by identifying the line replaceable unit manually using the various input functionalities of the WMMDU and then performing diagnostics).

If no failure of a line replaceable unit is detected at the system monitoring step 606, the operator may nevertheless desire to carry out diagnostics on various line replaceable units throughout the cargo handling system. The operator may also proceed in this fashion for all line replaceable units indicated as having experienced failure or an anomaly during the system monitoring step 606. In either such event, the operator may position the WMMDU proximate the line replaceable unit requiring diagnostics and thereby identify the line replaceable unit at an identification step 612. As described above, a reader, such as, for example, an RFID reader, within the WMMDU may be employed to read identification data associated with the line replacement unit. As illustrated, in various embodiments, the reader may identify the line replaceable unit as one of, for example, a (power drive unit) PDU, a freighter common turntables (FCT), a local control panel (LCP) or a master control panel (MCP), at the identification step 612. Following identification of the line replaceable unit, the operator may desire to request and receive specific information (or training materials) concerning the line replaceable unit, such as, for example, a fault isolation manual or video or a troubleshooting manual or video. Such request may be made at an information request step 614, which may be carried out prior to the diagnostic step 610 or at any other time. In various embodiments, the specific information may be stored on or accessed through a cloud server, may be stored on or accessed through the WMMDU, or may be accessed wirelessly through a local server or storage location. Ultimately, the information may be presented to the operator at an information review step 615. In various embodiments, the information may be reviewed on the touchscreen or graphical user interface or downloaded to a printer.

Figure 6C:
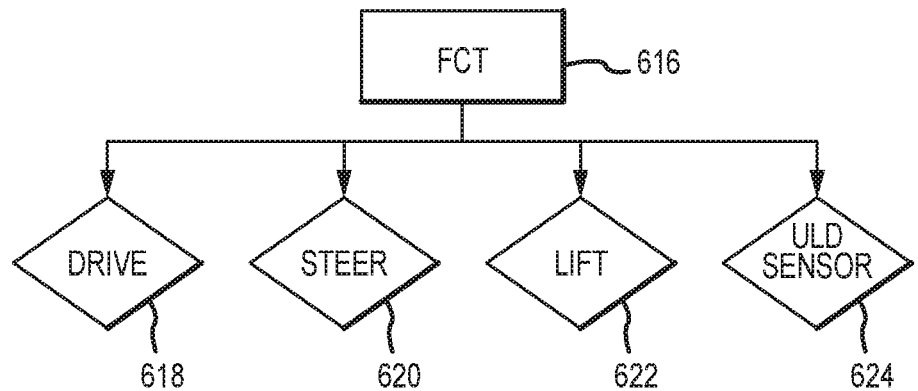
Figure 6D:
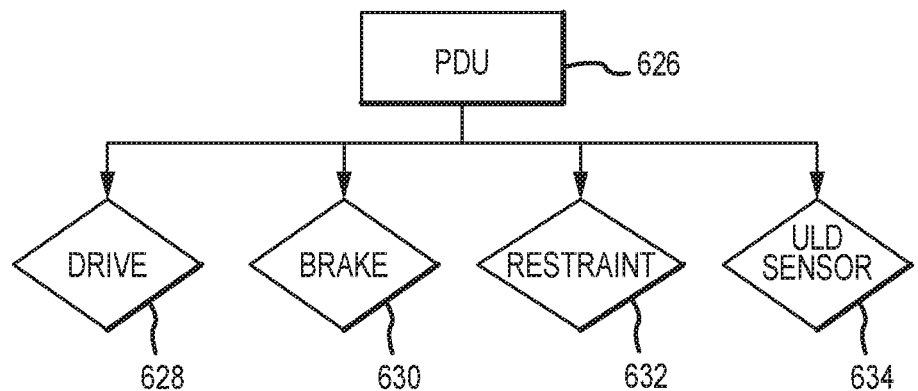
Figures 6E, 6F:
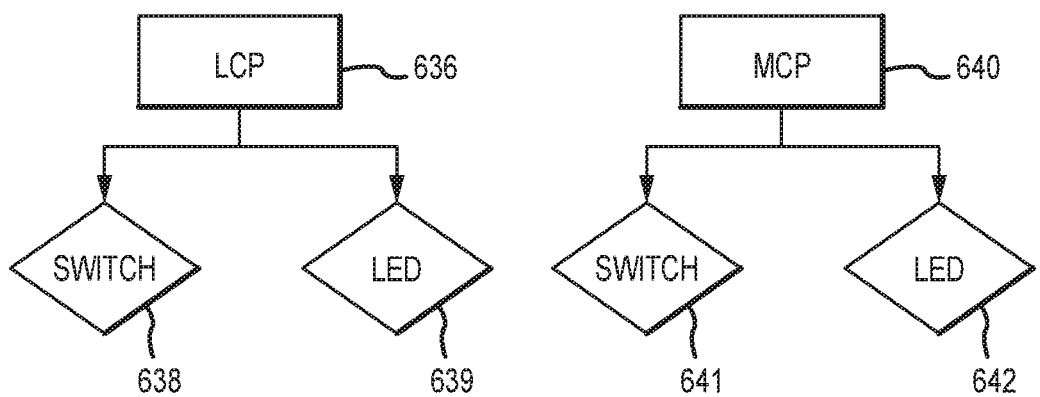

Following the identification step 612 and, if requested, the information review step 615, the diagnostic step 610 may be carried out on the line replaceable unit. Referring to FIG. 6C, for example, the diagnostic step 610 may include an FCT diagnostic step 616 that, in various embodiments, includes activating and verifying proper operational status of actuators associated with a drive mechanism 618 (for rotating a drive roller), a steering mechanism 620 (for steering the drive roller), a lift mechanism 622 (for raising and lowering the drive roller) and a ULD sensor 624 (for sensing the presence of a ULD). Referring to FIG. 6D, the diagnostic step 610 may include a PDU diagnostic step 626 that, in various embodiments, includes activating and verifying proper operational status of actuators associated with a drive mechanism 628 (for rotating a drive roller), a brake mechanism 630 (for braking the drive roller), a restraint mechanism 632 (for restraining a ULD) and a ULD sensor 634 (for sensing the presence of a ULD). Referring to FIG. 6E, the diagnostic step 610 may include a LCP diagnostic step 636 that, in various embodiments, includes activating and verifying proper operational status of a power switch 638 and a LED panel display 639. Similarly, referring to FIG. 6F, the diagnostic step 610 may include a MCP diagnostic step 640 that, in various embodiments, includes activating and verifying proper operational status of a power switch 641 and a LED panel display 642. If any of the diagnostics fail, specifics concerning the failure may be provided through the graphical user interface and, in addition, the operator may be notified through an operator alert step 644, similar to the operator alert step 608 described above. Additional LRUs, such as, for example, the various sensors or cameras positioned throughout the cargo handling system, may be diagnosed as appropriate at additional LRU diagnostic steps.

Following the diagnostic step 610, the operator may be queried if replacement parts are desired at a replacement parts step 646. If the operator desires to order parts, then the WMMDU may connect to a vendor or support provider or other supplier of the replacement parts (collectively referred to as a source of replacement parts) through a replacement parts order step 648. In various embodiments, the replacement parts order step 648 may comprise linking to a parts list stored within the WMMDU (or a server or storage device in communication with the WMMDU) or connecting to an online catalog through an internal portal or web-based application stored on the WMMDU. In various embodiments, the main flowchart 600 includes a photo step 650 whereby an operator is provided the ability to take a photograph of the line replaceable unit or a portion thereof. The photograph may be sent via the WMMDU to the vendor or support provider or other supplier of the replacement parts, to customer or product support, or to other maintenance personnel for analysis or failure critique. The photograph may also be saved within the WMMDU or to a shared database within the cargo maintenance system.

The above steps may be repeated through a diagnostic return step 652, which allows the operator to cycle the diagnostic step 610 on as many line replaceable units as necessary or desired. Following the diagnostic investigation of the line replaceable units, or in lieu thereof, in various embodiments, the system monitoring step 606 may also include monitoring of a latch/lock (e.g., restraint) verification system. In various embodiments, monitoring of the latch/lock verification system allows the operator to monitor the operational status of the restraint system of the cargo handling system as a whole, rather than monitoring separately the individual restraints as line replaceable units. For example, the WMMDU may be configured to cycle through each ULD restraint within the system and verify its operability and ability to properly lock and unlock. In various embodiments, the latch/lock verification system may be incorporated into the system monitoring step 606 or may be configured as a latch/lock verification system step 654 separate from the system monitoring step 606. If a failure or an anomaly of a restraint is detected, the operator may diagnose the restraint, first by returning to the identification step 612 and then proceeding to the diagnostic step 610.

Following the diagnostic investigation of the line replaceable units, or in lieu thereof, in various embodiments, the system monitoring step 606 may also include monitoring of a sensing system, such as, for example, the sensing system 370 described above with reference to FIGS. 3A and 3B. In various embodiments, monitoring of the sensing system allows the operator to monitor the operational status of the sensors and cameras, configured to monitor activity, such as, for example, the presence of ULDs or operators within the various sections of the cargo handling system as a whole, rather than monitoring to components separately as line replaceable units. For example, the WMMDU may be configured to cycle through each sensor and camera within the system and verify their operability. In various embodiments, for example, a sensing system verification system may be incorporated into the system monitoring step 606 or may be configured as a sensing system verification step 656 separate from the system monitoring step 606. If a failure or an anomaly of a sensor or camera is detected, the operator may diagnose the failure, first by returning to the identification step 612 and then proceeding to the diagnostic step 610.

Other features consistent with the foregoing systems and description may be incorporated into the WMMDU, in accordance with various embodiments. One such feature includes a collision detection and avoidance feature. In various embodiments, for example, the sensors and cameras may be configured to detect the positions of ULDs and humans throughout the cargo handling system during maintenance operations. The various positions of the ULDs and humans may be detected and displayed on the graphical user interface or touch screen display of the WMMDU. Knowledge of such positions, which may change temporally, may be used to avoid collisions between the ULDs or between a human and a ULD during maintenance operations. In various embodiments, for example, immediately following an operator completing the logon step 604, positional data of all ULDs and humans within proximity of the cargo handling system may be displayed to the operator prior to any maintenance operations being commenced, thereby providing an additional level of safety to humans and avoidance of damage to ULDs or to the cargo handling system.

Figure 7:
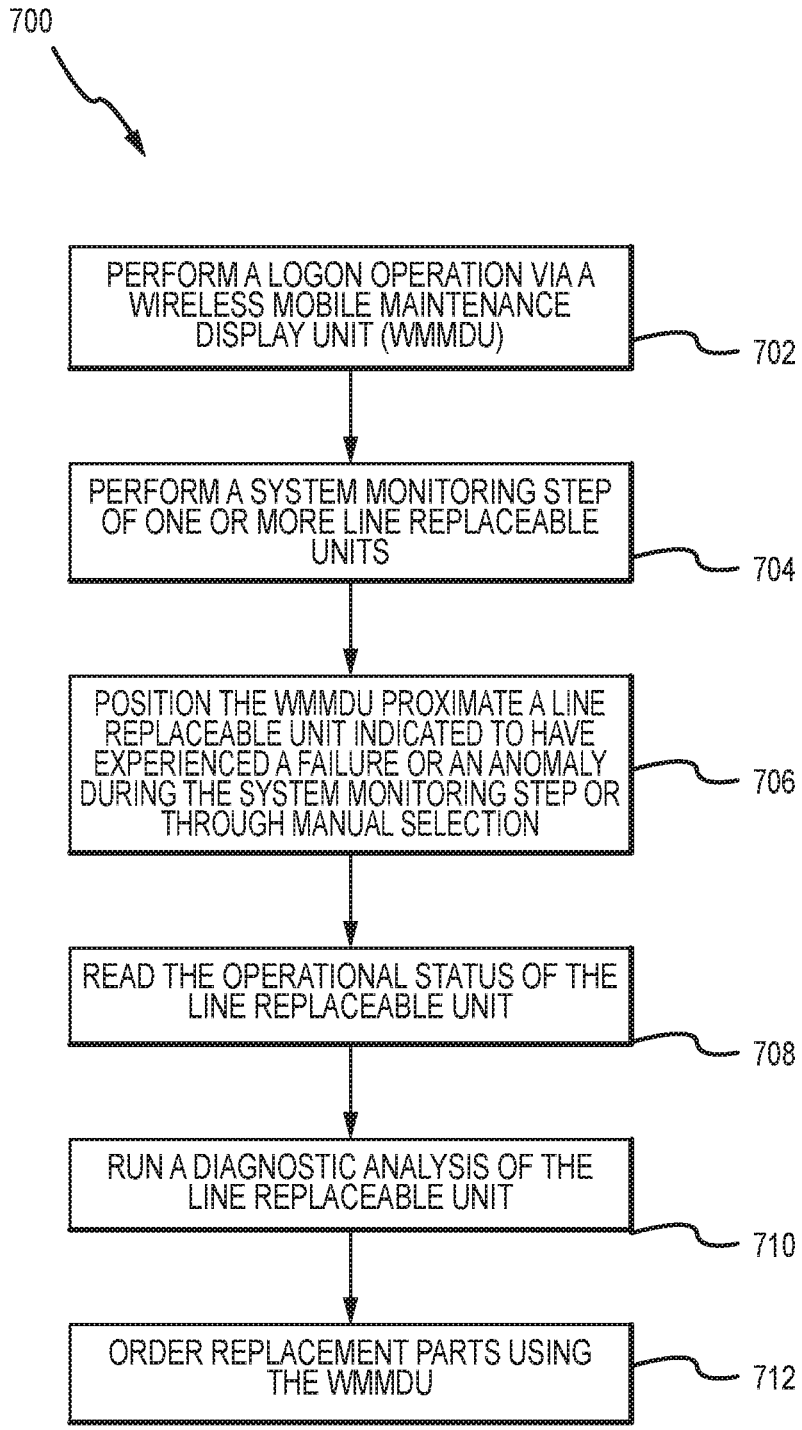
FIG. 7 describes a method of monitoring an operational status of a line replaceable unit within a cargo handling system

Referring now to FIG. 7, a method of monitoring an operational status of a line replaceable unit within a cargo handling system is described. In various embodiments the method 700 includes the following steps. A first step 702 includes performing a logon operation via a wireless mobile maintenance display unit (WMMDU). A second step 704 includes performing a system monitoring step, whereby the operational status of each LRU comprising the cargo handling system is assessed via an input from the WMMDU. A third step 706 includes positioning the WMMDU proximate a line replaceable unit indicated to have experienced a failure or an anomaly during the system monitoring step or through a manual selection process not part of the system monitoring. For example, the operator may identify a line replaceable unit manually through entry of appropriate identifying information directly into the WMMDU, rather than positioning the WMMDU proximate the line replaceable unit and reading the identifying information, thereby facilitating the running of diagnostics on line replaceable units that are difficult to reach or access. A fourth step 708 includes reading the operational status of the line replaceable unit from a data device in operable communication with the line replaceable unit via the WMMDU. A fifth step 710 includes running a diagnostic analysis of the line replaceable unit. A sixth step 712 includes ordering replacement parts for the line replaceable unit using the WMMDU to access a supply or parts, if needed. In various embodiments, the method 700 further includes the step of accessing a server or a storage location configured to provide at least one of a fault isolation manual, a cargo load plan, a parts catalog or a virtual training center. In various embodiments, the line replacement unit comprises at least one of a power drive unit, a local control panel or a master control panel.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
   a wireless mobile maintenance display unit configured to monitor a line replaceable unit;
   an identification tag configured to receive, store, and transmit data from the line replaceable unit, the identification tag configured to provide an operational status data concerning the line replaceable unit to the wireless mobile maintenance display unit;
   a first server configured to store a catalog of parts for repairing the line replaceable unit;
   a system controller configured to communicate with a source of replacement parts for the line replaceable unit; and
   a communication module operably communicating with the system controller and configured to alert an operator, via an operator alert, of at least one of a failure or an anomaly associated with the line replaceable unit.

2. The cargo handling system of claim 1, wherein the identification tag comprises a radio frequency identification tag.

3. The cargo handling system of claim 2, wherein the radio frequency identification tag is configured to provide identification data of the line replaceable unit and the operational status data of the line replaceable unit.

4. The cargo handling system of claim 3, wherein the line replaceable unit comprises at least one of a power drive unit, a local control panel or a master control panel.

5. The cargo handling system of claim 4, wherein the wireless mobile maintenance display unit is configured to read identification data unique to the operator.

6. The cargo handling system of claim 1, further comprising a virtual training center configured to provide access to simulator-like training materials, enabling the operator to receive assistance with inspection or repair of the line replaceable unit.

7. The cargo handling system of claim 6, further comprising a second server configured to store a fault isolation manual or a troubleshooting manual for the line replaceable unit.

8. The cargo handling system of claim 7, wherein the wireless mobile maintenance display unit is configured for operable communication with the second server.

9. The cargo handling system of claim 1, wherein the wireless mobile maintenance display unit is configured for operable communication with at least one of the system controller or an auxiliary control system.

10. The cargo handling system of claim 9, wherein the at least one of the system controller or the auxiliary control system comprises a second server configured to store at least one of a fault isolation manual or a virtual training center.

11. A wireless mobile maintenance display unit, comprising:
- a first reader configured to read an identification data unique to an operator;
- a second reader configured to read an operational status data of a line replaceable unit;
- a recording module configured to record an audio data or a video data concerning the line replaceable unit, the wireless mobile maintenance display unit being configured to communicate the audio data or the video data to a vendor or a support provider;
- a communication module configured for operable communication with a system controller or an auxiliary control system to communicate with the vendor or the support provider; and
- an operator alert configured to alert the operator of an anomaly within or associated with the line replaceable unit.

12. The wireless mobile maintenance display unit of claim 11, wherein the first reader includes at least one of a first radio frequency identification device or a near-field communication device configured to read the identification data unique to the operator.

13. The wireless mobile maintenance display unit of claim 12, wherein the second reader includes a second radio frequency identification device configured to read the operational status data of the line replaceable unit.

14. The wireless mobile maintenance display unit of claim 13, wherein the operator alert includes at least one of a rumble feedback mechanism, a visual indicator or a sound indicator.

15. The wireless mobile maintenance display unit of claim 14, further comprising a camera configured to capture a photograph of the line replaceable unit and wherein the wireless mobile maintenance display unit is configured to forward the photograph to the vendor or the support provider.

16. A method of monitoring an operational status of a plurality of line replaceable units within a cargo handling system using a wireless mobile maintenance display unit, comprising:
- identifying a failed unit or an anomalous unit experiencing a failure or an anomaly from among the plurality of line replaceable units;
- reading, via the wireless mobile maintenance display unit, the operational status of the failed unit or the anomalous unit from an identification tag in operable communication with the failed unit or the anomalous unit; and
- activating an operator alert connected to the wireless mobile maintenance display unit configured to alert an operator of the failure or the anomaly within or associated with the failed unit or the anomalous unit.

17. The method of claim 16, further comprising running a diagnostic analysis of the failed unit or the anomalous unit via the wireless mobile maintenance display unit.

18. The method of claim 17, further comprising accessing a server or a storage location configured to provide at least one of a fault isolation manual, a cargo load plan, a parts catalog or a virtual training center via the wireless mobile maintenance display unit.

19. The method of claim 18, further comprising communicating with a source of replacement parts via the wireless mobile maintenance display unit to order replacement parts for the failed unit or the anomalous unit.

20. The method of claim 19, wherein the plurality of line replaceable units comprises at least one of a power drive unit, a local control panel or a master control panel.

* * * * *